United States Patent [19]
Harb

[11] Patent Number: 6,052,974
[45] Date of Patent: Apr. 25, 2000

[54] ADJUSTABLE HEIGHT HEAD FOR STRING TRIMMER

[76] Inventor: Mitchell A. Harb, P.O. Box 261, Lexington, N.C. 27293

[21] Appl. No.: 09/417,752

[22] Filed: Oct. 14, 1999

[51] Int. Cl.[7] .................................................. A01D 34/00
[52] U.S. Cl. .............................. 56/12.7; 56/255; 30/276; 30/329; 30/347
[58] Field of Search .................................... 56/12.1, 12.7, 56/16.7, 16.9, 17.5, 255, 295; 30/276, 329, 347

[56] References Cited

U.S. PATENT DOCUMENTS

| | | | |
|---|---|---|---|
| 4,062,115 | 12/1977 | Lee | 30/276 |
| 4,211,005 | 7/1980 | Woods | 30/276 |
| 4,282,653 | 8/1981 | Comer et al. | 30/276 |
| 4,703,613 | 11/1987 | Raymond | 56/12.7 |
| 4,726,176 | 2/1988 | McGrew | 56/12.7 |
| 4,756,146 | 7/1988 | Rouse | 56/12.7 |
| 4,819,416 | 4/1989 | Jones | 56/12.7 |
| 4,873,819 | 10/1989 | Shivers et al. | 56/17.5 |
| 4,905,465 | 3/1990 | Jones et al. | 56/295 |
| 4,962,630 | 10/1990 | Jones | 56/12.7 |
| 5,023,998 | 6/1991 | Masciarella et al. | 30/276 |
| 5,048,278 | 9/1991 | Jones et al. | 56/295 |
| 5,197,264 | 3/1993 | Lacey | 56/12.1 |
| 5,713,191 | 2/1998 | Welton | 56/12.1 |
| 5,862,655 | 1/1999 | Altamirano et al. | 56/12.1 |
| 5,906,051 | 5/1999 | Nannen | 30/276 |
| 5,960,617 | 10/1999 | Sheldon | 56/17.5 |
| 5,970,693 | 10/1999 | Ciaglo | 56/12.7 |

*Primary Examiner*—Thomas B. Will
*Assistant Examiner*—Nathan Mammen
*Attorney, Agent, or Firm*—Richard C. Litman

[57] ABSTRACT

An adjustable height cutting head for a string trimmer machine provides for the positive locking in place of the cutting string or line holder portion of the device, relative to a cylindrical central core which secures conventionally to the machine. The central core includes a series of adjustment holes of different heights through the wall thereof, with the collar of the line holder having a series of holes corresponding to any one of the heights of the adjustment holes in the central core. The height of the line holder disc is quickly and easily positively locked in place at the desired height relative to the central core, by securing a few bolts in the desired position. The present system precludes slippage of the line holder portion relative to the core, and moreover distributes the cutting lines evenly about the periphery of the line holder disc for proper balance of the assembly to preclude vibration and fatigue of the machine and operator. Each of the line attachment clamps is also positively secured in place by a pair of bolts to provide a positive clamping action on each trimmer line to preclude slippage thereof. Yet, the trimmer lines are quickly and easily replaced merely by loosening the two bolts of each clamp, withdrawing the old line, inserting one end of the new line in the clamping channel, pushing the new line through the channel, and tightening the clamp bolts. Complete removal of the bolts and clamp is not required.

20 Claims, 5 Drawing Sheets

ADJUSTABLE HEIGHT HEAD FOR STRING TRIMMER

BACKGROUND OF THE INVENTION

1. Field of the Invention

The present invention relates generally to powered cutting and trimming devices, and more specifically to a cutting head for a string or filament type grass cutting or trimming machine. The present cutting head provides positive means for locking the cutting elements at any one of a series of specific heights above the bottom of the central core of the head, and thus above the ground surface against which the head bears during cutting and trimming operations. Additional features, such as means for removably securing a series of cutting strings or filaments in the head, are also disclosed.

2. Description of the Related Art

The principle of a rapidly spinning flexible filament for use in cutting grass and other vegetation, has been expanded to include its use in wheeled (ground supported) mowers and trimming machines, as well as hand held grass cutting and trimming machines. There are essentially two problems with such devices: (1) It is difficult to hold or maintain an accurate and consistent cutting height, and (2) the string filament cutting elements are relatively soft and fragile in comparison to rigid steel cutting blades, and require frequent replacement.

While the string replacement problem has been responded to in a number of different ways, they have generally not been totally satisfactory. The easiest means of string or line replacement, by means of a so-called "bump feed" cutting head, is not adaptable to specific height adjustment due to its configuration. Most devices of the prior art have been directed away from any provision for positive, accurate height adjustment of the cutting head, in order to provide for ease of line replacement when the cutting line becomes worn or broken.

Accordingly, a need will be seen for a string trimmer type cutting head which provides positive adjustment for cutting height, and which also provides relative ease of adjustment of the cutting string or line as well. The present invention responds to both of these requirements in a single device, which is adaptable to virtually any type of powered string trimmer machinery.

A discussion of the related art of which the present inventor is aware, and its differences and distinctions from the present invention, is provided below.

U.S. Pat. No. 4,062,115 issued on Dec. 13, 1977 to William R. Lee, titled "Rotary Garden Cutter," describes a string trimmer type cutting head in which a plurality of separate strings are held in place by sandwiching them in a circumferential space between an inner core and an outer sleeve, with the ends of the lines passing outwardly through holes in the sleeve. The inner core is unscrewed relative to the outer sleeve to loosen the lines for replacement, and must be removed completely in order to access the interior of the sleeve to guide the replacement line through the sleeve holes. Lee does not provide any means of adjusting the cutting height of his cutting head. In contrast, the present cutting head strings are held in place by a series of independently secured peripheral clamps, providing for the replacement of a single string or line at a time, if required. The string or line attachment clamps need only be loosened slightly, to permit complete replacement of the cutting filaments. The present cutting head also includes cutting height adjusting means.

U.S. Pat. No. 4,726,176 issued on Feb. 23, 1988 to David L. McGrew, titled "Rotary Mower Cutter Means," describes a cutting head having a series of radial trimming string passages formed therein, terminating in a central recess. The cutting strings are passed through adjacent passages, with the central portions of all of the strings being clamped in place in the central recess by a single large washer or plate. As all of the cutting strings or elements are secured by a single threaded fastener, they cannot be loosened independently to provide for the replacement of a single element at a time. McGrew does not disclose any means of adjusting the cutting height for his cutting head, as provided by the present invention.

U.S. Pat. No. 4,756,146 issued on Jul. 12, 1988 to Russell V. Rouse, titled "String Trimmer Head And Method," describes a head formed of two mirror image stamped discs, with each disc having a series of semicircular trimmer string channels formed therein. The two discs are permanently assembled with the channels in registry to form a series of closed line passages. The trimmer string or line is held in place by routing it through one arcuate passage, along a peripheral groove between the first and a second passage, and then through the second passage. No mechanical clamping means is used to secure the trimmer line within the Rouse cutting head, as opposed to the present trimmer head with its mechanical clamps for securing the line segments. Moreover, Rouse does not provide any form of height adjustment for his trimmer head, as provided in the present string trimmer head invention.

U.S. Pat. No. 4,819,416 issued on Apr. 11, 1989 to Dallas W. Jones, titled "Rotary Cutting Member For Use With Lawnmowers And The Like," describes a cutting head having a series of line holding elements, with the line being looped through each of the elements. The line is held in place by the relatively tight bend formed in the line due to the close proximity of the adjacent line passages. While each line may be serviced independently of the others, no mechanical clamping means is provided to secure the lines positively in place, as provided in the present cutting head. Moreover, Jones does not provide any means of adjusting the cutting height for his trimmer head.

U.S. Pat. No. 4,873,819 issued on Oct. 17, 1989 to Charles C. Shivers et al., titled "Grass Trimmer," describes a "unicycle" type cutting machine, in which a single wheel is positioned concentrically beneath the cutting head. The only means of height adjustment is to tilt the entire machine in one direction or another, which means is well known in hand held grass trimmers and the like. No means of keeping the cutting head level, while still providing height adjustment for the cutting elements, is disclosed in the Shivers et al. U.S. Patent. Moreover, Shivers et al. utilize a pair of rigid cutting elements which are bolted to the periphery of the cutting head, unlike the multiple flexible string or filament cutting elements of the present trimmer head.

U.S. Pat. No. 4,905,465 issued on Mar. 6, 1990 to Dallas W. Jones et al., titled "Rotary Cutting Member For Use With Lawn Mowers And The Like," describes a ring having a plurality of vertically stepped holes in the side thereof. The stepped holes provide for the installation of a plurality of cutting strings or lines therethrough, with the lines being doubled over inside the ring for retention of each line. The stepped holes provide for each line to be installed at a different height to provide a series of different cutting heights, rather than for adjustment of a single plane cutting height, as provided by the present cutting head. In the event that the user wishes to adjust the cutting height of the Jones et al. device, each line must be removed from its installed point in the ring and replaced at the new location for the new height desired, whereas the cutting heights of all of the cutting elements of the present cutting head are adjusted simultaneously by means of only a few bolts. It is also noted that the installation of the trimmer lines at different heights in the Jones et al. cutting head, results in opposite cutting lines not being precisely opposite one another, thus creating imbalance in the device. The present cutting head does not have this problem.

U.S. Pat. No. 4,962,630 issued on Oct. 16, 1990 to Dallas W. Jones, titled "Rotary Cutting Member With Flexible Filaments For Use With Lawnmowers And The Like," describes a device which is essentially a combination of the '416 and '465 U.S. Patents issued to the same inventor, and discussed further above. A plurality of arms is provided, with each arm having means for holding a doubled flexible cutting line element therein. The two holes provided for each line are at different heights to provide two different cutting heights simultaneously, but no adjustment is provided; each pair of holes in each arm is the same height. As in the other Jones U.S. Patents discussed above, no positive mechanical locking means is provided for securing the cutting elements, nor is any height adjustment provided for the cutting head, as provided by the present cutting head invention.

U.S. Pat. No. 5,023,998 issued on Jun. 18, 1991 to Andrew M. Masciarella et al., titled "Filament Holder For A Rotating Filament Vegetation Cutter," describes a string trimmer head in which two cutting lines extend from one side of the head to the other, crossing one another as they pass the central driveshaft of the device. The two lines describe a sinusoidal path as they pass through various gripping elements to hold them in place. No positive mechanical clamping means is provided for securing the lines in the Masciarella et al. cutting head, nor is any means provided for adjusting the height of the Masciarella et al. cutting head, as provided by the present filament cutting head invention.

U.S. Pat. No. 5,048,278 issued on Sep. 17, 1991 to Dallas W. Jones et al., titled "Rotary Cutting Member For Use With Lawn Mowers And The Like," describes a flexible cutting line trimmer head somewhat resembling that of the '465 U.S. Patent to the same inventor, discussed further above. The device of the '278 U.S. Patent comprises a generally disc shaped cutting head having a plurality of generally radially disposed trimmer line passages. The trimmer lines are passed through adjoining passages to form a generally U-shaped path in the head. The outlets of each of the passages are at different heights relative to one another, to provide a plurality of different cutting heights. However, no means is provided for adjusting the cutting height of the device, nor is any positive mechanical means provided for clamping the cutting filaments in place, as provided in the present cutting head.

U.S. Pat. No. 5,197,264 issued on Mar. 30, 1993 to Paul Lacey, titled "Universal Filament Trimmer Head," describes a string trimmer head in which each of a plurality of cutting lines is double looped through a series of four holes in the periphery of the device, to hold the lines in place. No positive clamping means is provided by Lacey for holding the lines in place, as provided in the present line trimmer head. In addition, Lacey does not provide any means of adjusting the cutting height for his trimmer head, which feature is an important part of the present string trimmer head invention.

U.S. Pat. No. 5,713,191 issued on Feb. 3, 1998 to Michael Welton, titled "Monofilament Line Based Cutter Assembly," describes a line trimmer head comprising a flat disc with a plurality of pairs of holes adjacent its edge. The cutting string or line is looped through adjacent holes with the friction of the bends in the line passing through the holes, holding the line in place. This is similar to the line holding means disclosed in the '416, '465, '630, and '264 U.S. Patents discussed further above; no positive clamping means is provided for positively securing the line in place on the head in any of the above patents. Moreover, Welton does not provide any means for adjusting the height of the cutting head or disc, as provided by the present invention.

Finally, U.S. Pat. No. 5,862,655 issued on Jan. 26, 1999 to Rolando Altamirano et al., titled "Adjustable Mowing And Trimming Apparatus," describes a wheeled line trimmer machine in which the cutting head comprises a spindle head with a cutting element having a split ring configuration, adjustably secured thereto. The cutting element is secured to the spindle head by a pinch bolt. While this arrangement provides infinitesimal adjustment of the cutting height, the cutting element is subject to slippage on the spindle head, due to the lack of positive locking of the cutting element to one of a series of specific locations on the spindle head. In practice, the infinitesimal adjustment is unnecessary in any event, with the height adjustment to the nearest inch, or perhaps half inch, being more than sufficient in the real world of slightly uneven terrain, even in a well maintained lawn. It is also noted that the requirement for a pinch bolt through one side of the cutting disc element, precludes any provision for the attachment of trimmer line to that point of the disc, thus reducing the number of trimming line elements which may be deployed from the disc. The pinch bolt attachment, with its relatively heavy bolt disposed to one side of the disc, results in an unbalanced condition for the disc, setting up undesirable vibrations during the operation of the machine, which result in more rapid wear of the machine and fatigue for the operator of the machine and which likely lead to the difficulty in locking the cutting disc in place to prevent movement thereof on the spindle head.

None of the above inventions and patents, either singly or in combination, is seen to describe the instant invention as claimed.

SUMMARY OF THE INVENTION

The present invention comprises an adjustable height cutting head for a string trimmer, in which the cutting disc element to which the cutting string or line elements attach is positively locked in place at one of a series of discrete height adjustment positions. The present cutting head may be adapted for use on a wheeled string or line trimmer machine, or on a hand held machine, as desired. The present cutting head essentially comprises a cylindrical central core, which secures to the conventional attachment fitting or spindle of the machine. The cylindrical core has a series of adjustment passages or holes formed in the wall thereof, with a series of indicators for selecting the cutting height.

The cutting disc to which the cutting lines are secured, includes an integral collar with a series of height adjustment bolt passages therethrough. These passages align with each row of adjustment passages of the core, as selected. The height is easily and quickly adjusted by securing the height adjustment bolts through the desired adjustment passages of the core, and tightening the bolts in place.

The cutting strings or lines are also positively locked in place by a series of clamps disposed about the periphery of the cutting disc element. A series of recesses is formed in the periphery of the cutting disc, with mating clamp plates provided for each recess. Each of the clamp plates has a channel formed about its inner edge, with the channel having a slightly smaller dimension than the cross section of the trimming line clamped therein. Each clamp is positively locked in place by two bolts, to preclude any slippage of the line secured therein. Optional leveling screws may be provided in each clamp if so desired, to adjust the clamping pressure for larger diameter cutting lines. The cutting lines are easily changed in the present cutting head, merely by loosening the two bolts of each clamp, withdrawing the old cutting line, inserting one end of the new line, passing the new line through the channel formed about the inner edge of the clamp, and tightening the bolts. It is not at all necessary to remove the clamp completely for replacing trimming line in the present invention; the operation is quickly and easily accomplished in only a few seconds.

Accordingly, it is a principal object of the invention to provide an improved string trimmer head for a powered trimmer machine in which the cutting height is quickly and easily adjusted, and in which the cutting element is positively locked in place relative to the central attachment fitting for the machine.

An additional object of the invention is to provide an improved string trimmer head including cutting height indicator means disposed upon the central fitting, for adjusting the cutting height to a predetermined level as desired.

It is another object of the invention to provide an improved string trimmer head which is adaptable to both wheeled and hand held powered string trimmer machines, as desired.

It is a further object of the invention to provide an improved string trimmer head in which the trimmer string or line elements are evenly disposed and balanced about the trimmer line holder of the device, for proper balance of the assembly and for precluding undue vibration of the assembly and machine.

Still another object of the invention is to provide an improved string trimmer head using clamp means for positively securing the trimmer lines in place to preclude slippage thereof.

It is an object of the invention to provide improved elements and arrangements thereof in an apparatus for the purposes described which is inexpensive, dependable and fully effective in accomplishing its intended purposes.

These and other objects of the present invention will become apparent upon review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
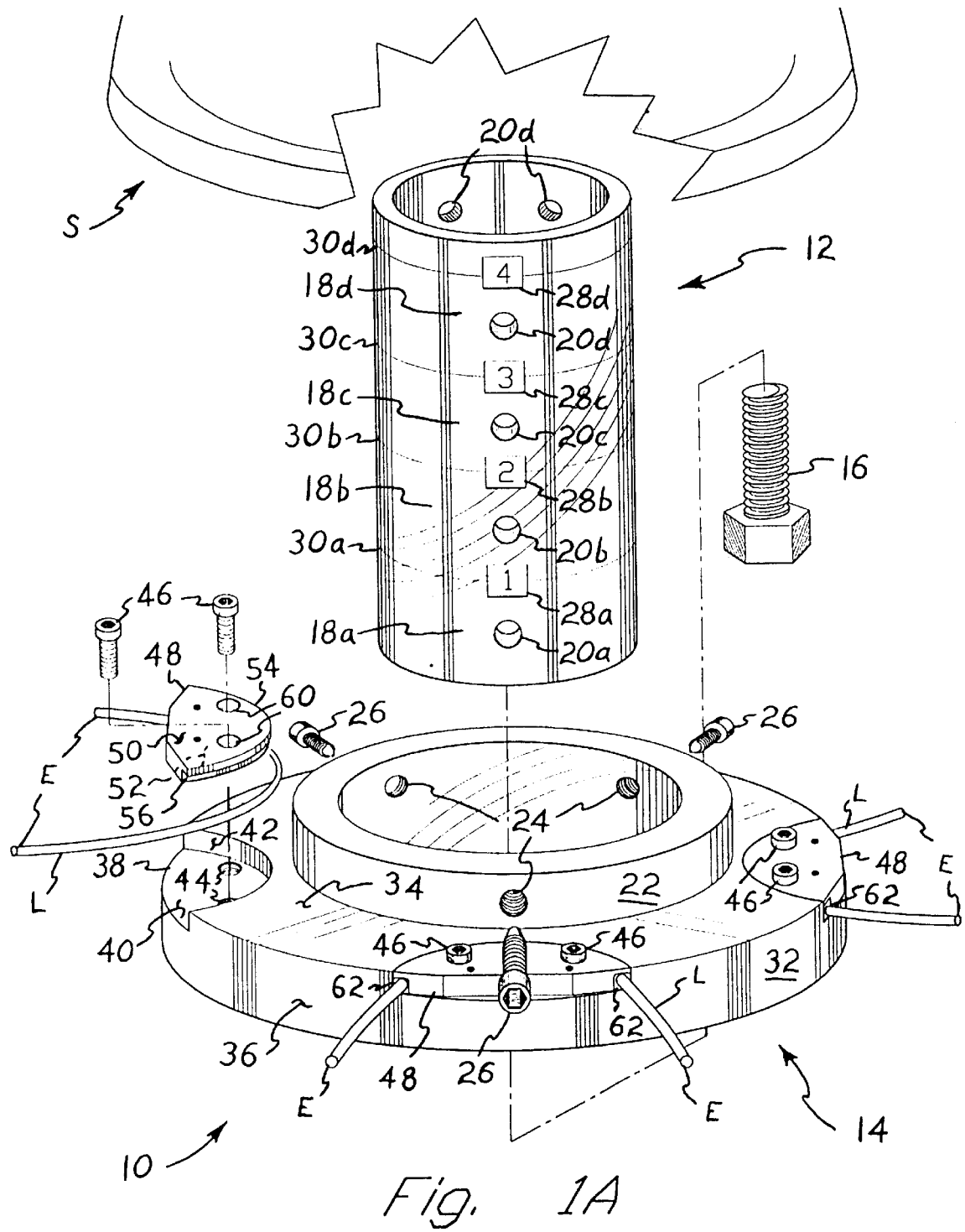
FIG. 1A is an exploded perspective view of the present adjustable height string trimmer head assembly, showing its various features and adjustment means.

The present invention comprises a cutting or trimming head for a string trimmer type powered grass cutting or trimming machine or the like, with the present trimming head 10 being illustrated in the exploded perspective view of FIG. 1A, beneath the shroud S of a string trimmer. The present trimming head 10 may be used with various powered devices, with the term "string" being generally descriptive of the plastic (e.g., Nylon, etc.) monofilament line nearly universally used in such machines, and used with the present adjustable trimming head 10.

The present adjustable height string trimmer head 10 generally comprises a central core 12 and a height adjustment plate 14 removably and adjustably securable to the core 12. These two components 12 and 14 generally provide for the positive locking of the position of the height adjustment plate 14 to the core 12, at any one of a series of discrete heights along the core 12, as desired.

The central core 12 is of generally cylindrical configuration, and includes a conventional diametric plate therein (not shown) having a bolt attachment hole formed therethrough. The central core component 12 is thus removably installable to the output shaft of a conventional string trimmer machine, by means of passing the bolt 16 through the conventional bolt attachment hole of the core 12, and securing the bolt 16 conventionally in the output shaft (not shown) of the trimming machine.

The core 12 includes a series of circumferentially disposed rows 18a through 18d of unthreaded height adjustment holes 20 formed through the wall thereof, with each row 18a through 18d having a series of height adjustment holes, respectively 20a through 20d, evenly spaced circumferentially about the cylindrical central core 12. It will be seen that more or fewer such rows 18a through 18d and holes 20a through 20d may be provided, as desired, with spacing therebetween as desired. Only the top row of three holes 20d is shown completely in FIG. 1A due to the perspective of the drawing Figure, but it will be seen that the other rows 18a through 18c each contain an identical number of three holes each.

The height adjustment plate 14 includes an integral locking collar 22, with the collar 22 fitting closely about the outer diameter of the central core 12 and containing a single circumferentially disposed row of threaded attachment holes 24 formed therethrough. The locking collar attachment holes 24 will align with the holes of any one of the height adjusting hole rows 18a through 18d, depending upon the position of the height adjustment plate 14 and its locking collar 22 relative to the rows 18a through 18d of locking holes 20a through 20d in the central core 12. While a series of three evenly spaced locking collar attachment holes 24 are shown, circumferentially spaced at one hundred twenty degrees apart from one another, it will be seen that more or fewer such holes may be provided, with a corresponding number of holes being provided in each of the rows 18a through 18d. However, a series of three locking collar attachment holes 24, and three holes in each of the rows 18a through 18d, is optimum for proper alignment of the components 12 and 14, while still providing relatively quick and simple adjustment.

A series of collar attachment bolts 26 is provided for securing the locking collar 22, and thus the height adjusting plate 14, to the central core 12. The bolts need not be completely removed from the locking collar 22 for adjustment of the plate 14 upwardly or downwardly along the central core 12, but need only be loosened a few turns to the point that their inner ends clear the wall of the central core 12 for the plate 14 to be adjusted relative to the core 12.

The central core 12 may include means for facilitating precise height adjustment of the height adjusting plate 14 thereon. A series of height indicator numbers 28a through 28d is marked along the length of the core 12, adjacent to corresponding ones of the height adjustment holes 20a through 20d. Corresponding plate height adjustment indicator lines 30a through 30c may also be provided circumferentially about the core 12. To adjust the height of the plate 14 to the desired level, one need only loosen the collar locking screws 26 as required, slide the plate 14 and its integral locking collar 22 upwardly or downwardly along the central core 12 and align the upper edge of the locking collar 22 with the corresponding line 30a through 30d of the cutting height desired, and secure the collar locking bolts 26 through the corresponding row 18a through 18d of holes 20a through 20d in the core 12.

The outer portion of the adjuster plate 14 comprises a trimmer line attachment disc 32, which is formed integrally with the locking collar 22 as a single, unitary component. The trimmer line disc 32 includes a series of trimmer line attachment means formed in the upper surface 34 and disposed about the periphery 36 thereof, as shown in FIG. 1A of the drawings. Preferably, a series of four trimmer line attachment means is evenly distributed about the periphery 36 of the trimmer line attachment disc 32, but more or fewer such line attachment means may be provided as desired. The line attachment means are evenly distributed about the periphery 36 of the disc 32 for proper balance of the assembly. One is not visible in FIG. 1A, due to the perspective of the view.

Each of the trimmer line attachment means or elements is essentially identical to one another, with details shown in the exploded view of the left hand attachment assembly of FIG. 1. Each line attachment means, element, or assembly includes a generally semicircular line attachment seat 38 machined or otherwise formed in the upper surface 34 of the periphery 36 of the line attachment disc portion 32 of the height adjusting plate 14. The seat 38 has a floor 40 which is lower than the upper surface 34 of the line attachment disc 32, and an inner peripheral wall 42, defining the innermost portion of the seat 38. Two threaded trimmer line clamping plate bolt attachment holes 44 are formed in the floor 40 of the seat, for the removable installation of a pair of trimmer line clamping plate attachment bolts 46.

A trimmer line clamping plate 48 is removably and adjustably secured within the seat 38. The plate 48 is formed of a flat sheet of material with an upper surface 50 and opposite lower surface 52, and is configured to fit closely within the corresponding seat area 38 of the disc 32, with an inner edge 54 which is congruent to and abuts the seat wall 42 when the clamping plate 48 is secured within the seat 38 by means of the two bolts 46. The clamping plate 48 includes a trimmer line groove 56 machined or otherwise formed at the juncture of the lower surface 52 and inner edge 54 of the plate 48. This groove 56, along with the inner edge of the seat floor 40 and the inner wall 42 of the clamping plate or line attachment seat 38, define a trimmer line passage 58 (shown more clearly in FIG. 2) for positively and immovably clamping a trimmer line L therein.

Each of the trimmer line clamping plates 48 includes a pair of unthreaded bolt holes 60 formed therethrough, with the bolt holes 60 aligning with the trimmer line clamping plate bolt attachment holes 44 of the seat 38 when the clamping plate 48 is secured to the seat, thereby clamping the trimmer line L in the passage 58 between the lower inner edges of the clamping plate 43 and seat 38. The semicircular, generally U-shaped configuration of the trimmer line passage 58 results in each passage 58 having two end openings 62 at the periphery 36 of the line attachment disc 32 portion of the height adjustment plate 14. Thus, only four separate sections of trimmer line L are required to provide eight extended ends E, thus providing considerable cutting and trimming power for the present height adjustable trimmer head 10.

Figure 1B:
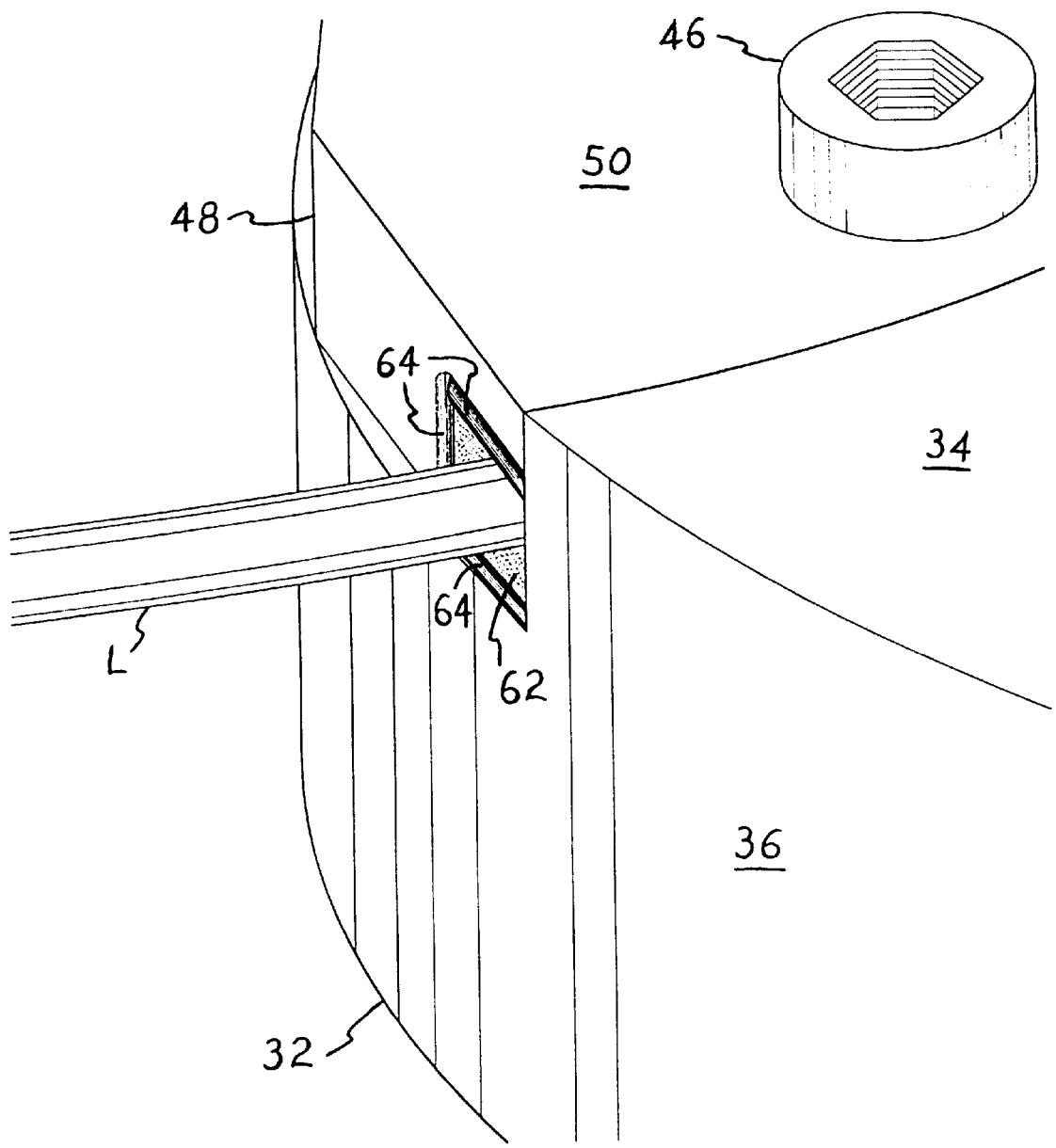
FIG. 1B is a perspective view of a broken away section of the trimmer line clamp means, showing the corner or edge relief for reducing cutting and breaking stress on the trimmer line.

FIG. 1B provides a detailed view of one of the end openings 62 of one of the trimmer line passages of the present line trimmer device 10. One critical problem with the relatively soft materials used for the manufacture of the trimmer lines L, is that such material is relatively easily cut or damaged by sharp edges. While this makes it easy for a person to cut a series of lengths of trimmer line L for use with the present trimmer head 10, it also requires that care be taken to avoid any undue stress to the line L, as at the end openings 62 of the trimmer line passages. FIG. 1B illustrates the means used to preclude such damage to the lines L, by providing a smoothly rounded radius 64 to the periphery of the end openings 62, thereby essentially precluding damage and chafing of the installed trimmer lines L at their passage exits.

Figure 2:
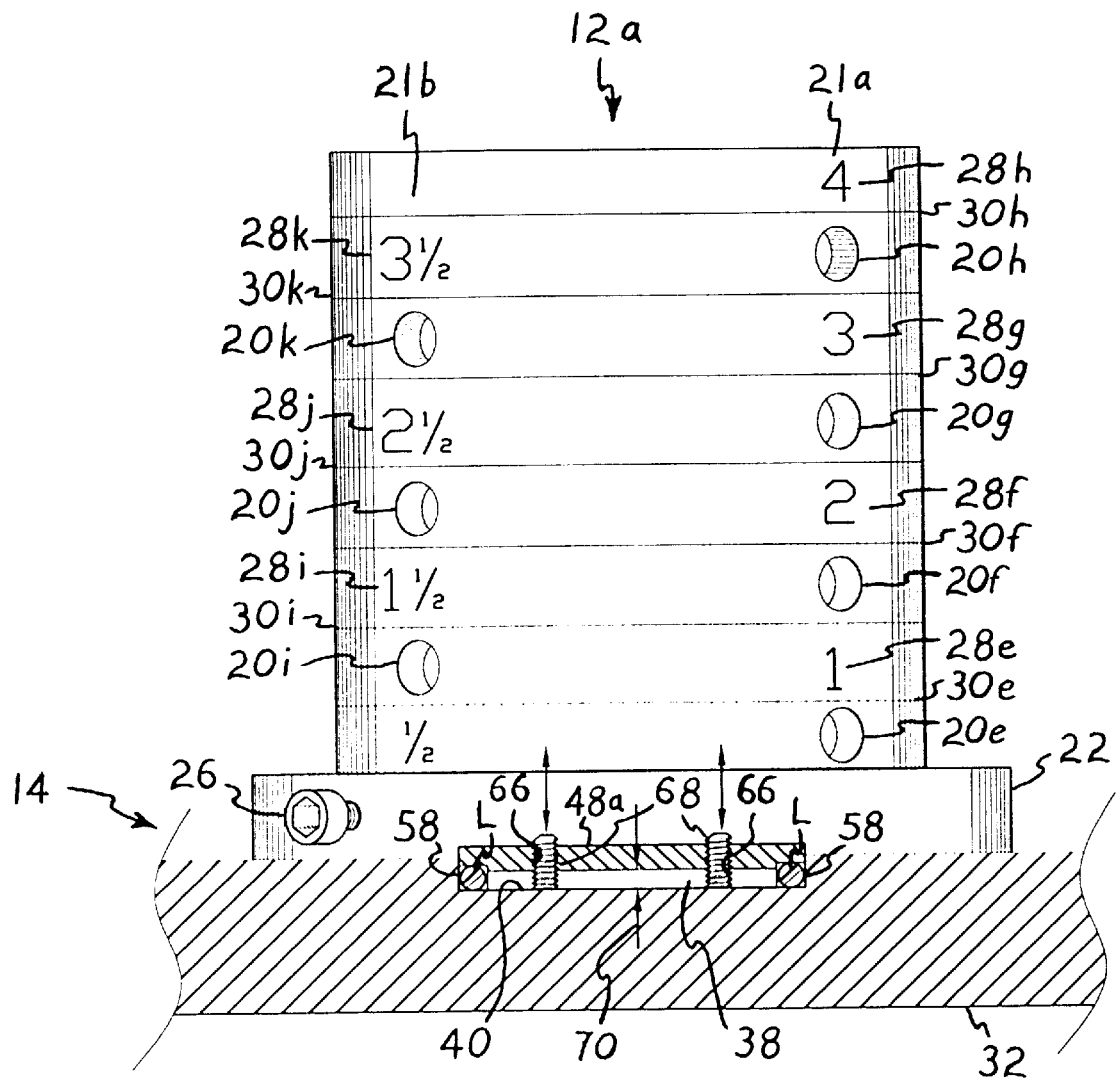
FIG. 2 is a side elevation view of the assembly in partial section, showing means for leveling the trimming line clamps.

FIG. 2 illustrates certain variations on the present invention. One of those variations or alternative embodiments is a provision for finer adjustment of the cutting height of the height adjustment plate 14. FIG. 2 discloses an alternative central core or cylinder 12a, with a greater number of rows of height adjustment holes than the cylinder core 12 of FIG. 1A. The height adjustment holes 20e through 20k may be staggered in two columns 21a and 21b, with the first column 21a (the right hand column in FIG. 2), comprising holes 20e through 20h, providing for the height adjustment of the height adjustment plate 14 in increments of even inches, and the second column 21b, comprising holes 20i through 20k, providing for height adjustment of the plate 14 in one inch increments beginning with one half inch.

The holes 20e through 20h of the first column 21a are marked accordingly with height indicator numbers 28e through 28h and height indicator lines 30e through 30h, with the remaining holes 20i through 20k of the second column 21b marked with corresponding height indicator numbers 28i through 28k and lines 30i through 30k. It will be seen that the locking collar 22 is secured to the central core 12a by a first height adjustment locking hole of the second column 21b, which would provide a lowest cutting height of only one half inch. This first hole is not seen due to being concealed by the collar 22. It should be noted that the adjustment holes or passages of FIGS. 1A and 2 are exemplary, and that any practicable number of height adjustment holes or passages, either in inches, metric, or other system, may be provided as desired.

FIG. 2 also illustrates a means for leveling or adjusting the height of each trimmer line clamping plate to accommodate different diameters or thicknesses of trimmer line, as desired. In the event that a relatively thick trimmer line L is used, the passage defined by the trimmer line clamping plate and the inner wall and floor of the trimmer line attachment seat, may not provide sufficient height for the line L to seat completely. Accordingly, the clamping plate may be modified as in the plate 48a of FIG. 2, with a pair of threaded adjuster passages 66 accepting a corresponding pair of adjuster screws 68 therein to bear adjustably against the floor 40 of the seat 38, with the adjustment of the screws 68 within the passages 66 acting as spacer means for adjusting the space or distance 70 between the clamping plate 14a and the floor 40 of the seat 38, and thus the height of the corresponding passage to provide the proper fit for the given diameter of trimmer line L secured therein.

In summary, the present adjustable height string trimmer head provides a much needed and convenient means of precisely adjusting the cutting height of the trimmer head in such a device. The present adjustable head may be formed of a variety of materials, with relatively strong and yet lightweight materials being preferred in order to provide the desired durability and yet reduce the rotating mass and inertia of the trimmer head. Aluminum is a particularly suitable material, with the central core, height adjustment plate, and each of the trimmer line clamping plates preferably being formed of aluminum.

Figure 3:
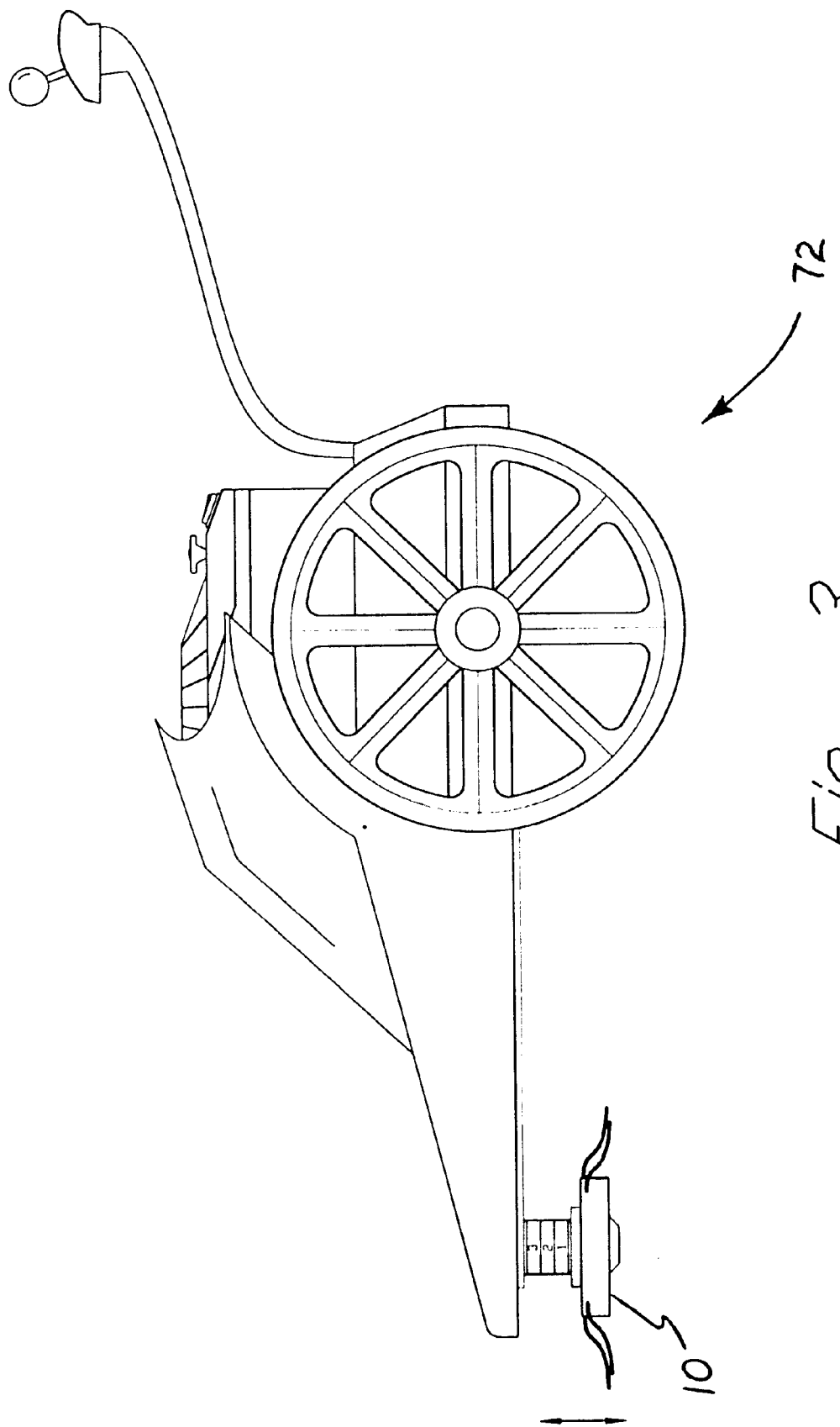
FIG. 3 is a side elevation view of the present adjustable string trimmer head installed upon a wheeled trimmer machine.
Figure 4:
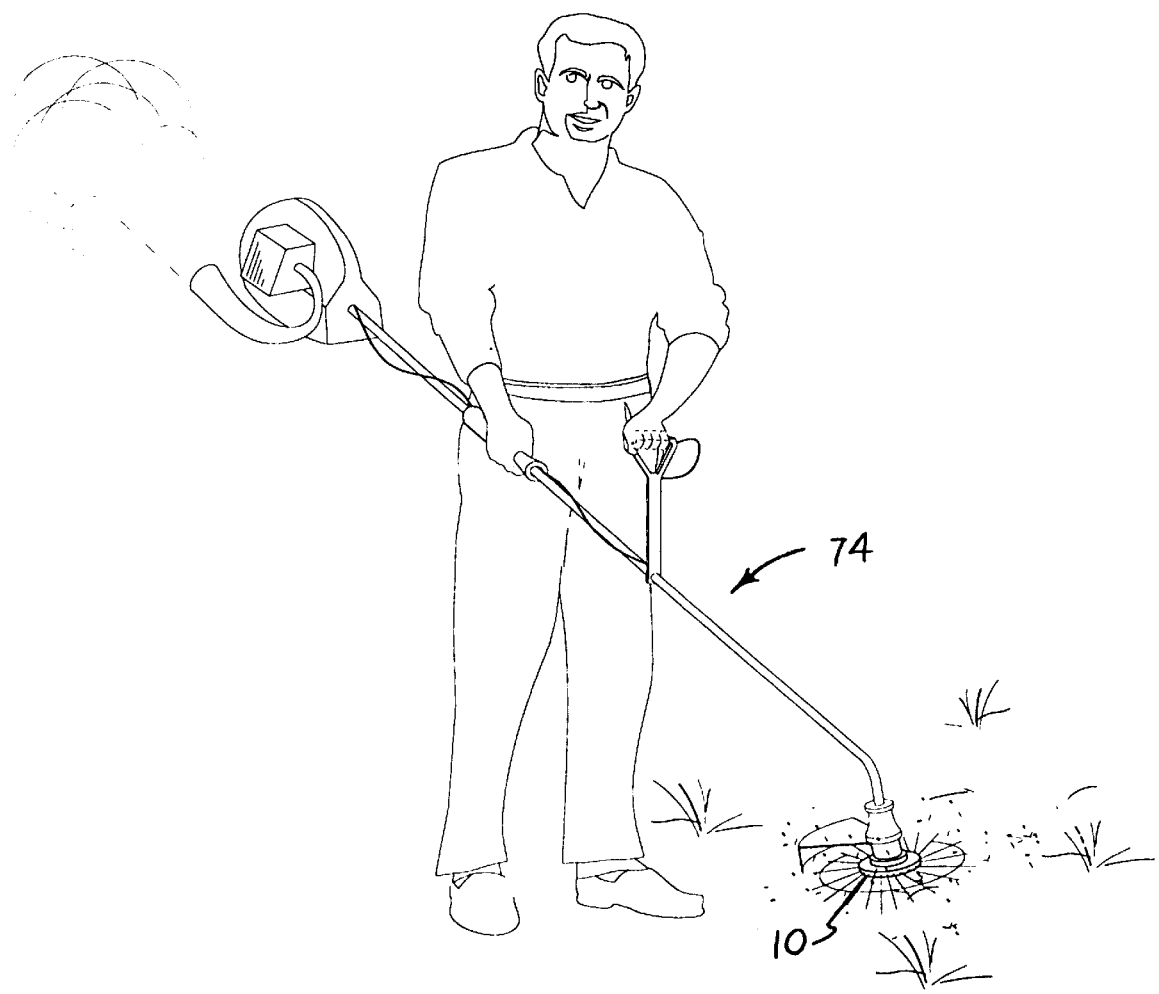
FIG. 4 is a side elevation view of the present adjustable string trimmer head installed upon a hand held trimmer machine.

The present adjustable trimmer head is particularly suitable for use with an otherwise conventional wheeled motorized (e.g., internal combustion engine, electric motor, etc.) string trimmer machine, such as the machine 72 illustrated generally in FIG. 3 of the drawings. Such wheeled machines 72 are particularly advantageous with the present adjustable trimmer head, in that they provide an essentially level cutting plane at all times for the trimmer head, thus providing an extremely even cut for such filament or string trimmer cutting heads. However, the present adjustable head may also be adapted for use with hand held string trimming machines, such as the machine 74 of FIG. 4 with which the present adjustable trimmer head is shown being used.

Cutting height adjustment is quickly and easily accomplished by loosening the height adjusting bolts securing the locking collar to the central core, sliding the locking collar and its integral trimmer line attachment disc upwardly or downwardly along the central core to the desired position, and tightening the bolts. The novel provision of bolts which pass radially through holes in the adjustable locking collar and also into mating threaded passages in the central core, result in the positive locking of the collar (and thus the trimmer line attachment disc) to the central core, with no possibility of slippage and resulting uneven trimming or loss of the attachment disc from the core. The configuration of the attachment disc, with its even distribution of the trimmer line attachment means therearound, also results in better balance and greatly reduced vibration for the assembly.

Adjustment or replacement of the trimmer lines is also easily accomplished, by merely loosening the two clamping screws securing each clamping plate to its respective seat in the trimmer line plate. The clamping screws need not be completely removed, but merely loosened sufficiently to allow the plate to loosen its grip on the underlying trimmer line. The old line may then be pulled out of the line clamping passage, and a new line inserted through one of the end openings of the passage. If the line has completely broken off at each passage, it is still not necessary to remove the clamping plate completely. Again, the mere loosening of the clamping bolts or screws releases the clamping pressure on the line. The new line may be inserted in one of the end openings of the passage, and used to push the old line at least partially from the opposite end opening where it may be grasped for removal. Line replacement may be accomplished in only moments using the present adjustable trimmer head, with much less time being required for the replacement of a line which has broken off at the periphery of the trimmer line disc, than with other prior art line trimmer heads.

Accordingly, the present adjustable height string trimmer head will be greatly appreciated by those who value their time in performing grass cutting and trimming work, and who appreciate the precision provided by the present invention in providing a uniform and precise cut for a lawn or similar surface.

It is to be understood that the present invention is not limited to the embodiments described above, but encompasses any and all embodiments within the scope of the following claims.

I claim:

1. An adjustable height head for a string trimmer, comprising:

a generally cylindrical central core, for conventionally removably securing to a string trimmer machine;

said central core including a plurality of circumferentially disposed rows of height adjustment holes therein, with each of said rows including a plurality of evenly spaced holes therein;

a height adjustment plate for adjustably and removably securing to said central core;

said plate comprising a locking collar for removably, positively, and adjustably securing to said central core, and a trimmer line attachment disc formed integrally therewith and extending outwardly therefrom;

said locking collar including a single circumferential row of attachment holes therethrough, with said locking collar attachment holes selectively aligning with said evenly spaced holes of each of said rows of said height adjustment holes of said central core when said locking collar is installed thereon; and said trimmer line attachment disc including at least an upper surface and a periphery with a plurality of trimmer line attachment means disposed therearound.

2. The adjustable height string trimmer head according to claim 1, wherein each of said trimmer line attachment means comprises:

a generally semicircular seat formed in said upper surface of said periphery of said trimmer line attachment disc;

said seat having a floor and an inner peripheral wall;

said seat further having two threaded trimmer line clamping plate bolt attachment holes formed therein;

a trimmer line clamping plate having an upper surface, an opposite lower surface, and an inner edge congruent to and abutting said seat wall when said clamping plate is secured to said seat;

said lower surface and said inner edge of said clamping plate including a trimmer line groove formed therein, with said trimmer line groove of said clamping plate and said floor and said inner peripheral wall of said seat defining a trimmer line passage for positively and immovably clamping a trimmer line therein when said clamping plate is secured to said seat, with said trimmer line passage having two end openings thereto for extending two ends of a trimmer line therefrom;

said trimmer line clamping plate further including two unthreaded bolt holes formed therethrough and aligning with said trimmer line clamping plate bolt attachment holes of said seat when said trimmer line clamping plate is secured to said seat; and two trimmer line clamping plate attachment bolts for adjustably and removably securing said trimmer line clamping plate to said seat, by means of said bolt holes of said trimmer line clamping plate and said attachment holes of said seat.

3. The adjustable height string trimmer head according to claim 2, including:

spacer means for adjustably spacing said trimmer line clamping plate from said floor of said seat, for adjusting said trimmer line passage relative to the trimmer line adjustably secured therein;

said spacer means comprising two threaded adjuster passages formed through said clamping plate, with each of said passages including an adjuster screw installed therethrough and bearing adjustably against said floor of said seat.

4. The adjustable height string trimmer head according to claim 2, wherein each of said end openings of said trimmer line passage has a smoothly radiused periphery for precluding damage and chafing of the trimmer line installed therein.

5. The adjustable height string trimmer head according to claim 1, wherein said trimmer line attachment means are evenly spaced and positioned about said trimmer line attachment disc for proper balance thereof.

6. The adjustable height string trimmer head according to claim 1, wherein said plurality of trimmer line attachment means comprises four evenly spaced and positioned trimmer line attachment elements, with each of said elements having two trimmer line ends extending generally radially therefrom.

7. The adjustable height string trimmer head according to claim 1, including a plurality of height adjustment indicator lines disposed upon said central core, with each of said indicator lines corresponding to one of said rows of height adjustment holes thereof.

8. The adjustable height string trimmer head according to claim 1 including a plurality of trimmer line clamping plates, wherein said central core, said height adjustment plate, and said trimmer line clamping plates are each formed of aluminum.

9. The adjustable height string trimmer head according to claim 1, including a wheeled motorized string trimmer machine for removably attaching and using said central core, said height adjustment plate, and said trimmer line attachment means therewith.

10. The adjustable height string trimmer head according to claim 1, including a hand held motorized string trimmer machine for removably attaching and using said central core, said height adjustment plate, and said trimmer line attachment means therewith.

11. An adjustable height head for a string trimmer, comprising:

a generally cylindrical central core, for conventionally removably securing to a string trimmer machine;

a height adjustment plate for adjustably and removably securing to said central core;

said central core and said height adjustment plate including cooperating height adjustment means for adjustably securing said height adjustment plate to said central core as desired;

said plate including a trimmer line attachment disc formed integrally therewith and extending outwardly therefrom;

said trimmer line attachment disc including at least an upper surface and a periphery with a plurality of trimmer line attachment means disposed therearound;

each of said trimmer line attachment means comprising a generally semicircular seat formed in said upper surface of said periphery of said trimmer line attachment disc;

said seat having a floor and an inner peripheral wall;

said seat further having two threaded trimmer line clamping plate bolt attachment holes formed therein;

a trimmer line clamping plate having an upper surface, an opposite lower surface, and an inner edge congruent to and abutting said seat wall when said clamping plate is secured to said seat;

said lower surface and said inner edge of said clamping plate including a trimmer line groove formed therein, with said trimmer line groove of said clamping plate and said floor and said inner peripheral wall of said seat defining a trimmer line passage for positively and immovably clamping a trimmer line therein when said clamping plate is secured to said seat, with said trimmer line passage having two end openings thereto for extending two ends of a trimmer line therefrom;

said trimmer line clamping plate further including two unthreaded bolt holes formed therethrough and aligning with said trimmer line clamping plate bolt attachment holes of said seat when said trimmer line clamping plate is secured to said seat; and two trimmer line clamping plate attachment bolts for adjustably and removably securing said trimmer line clamping plate to said seat, by means of said bolt holes of said trimmer line clamping plate and said attachment holes of said seat.

12. The adjustable height string trimmer head according to claim 11, wherein said cooperating height adjustment means for adjustably securing said height adjustment plate to said core, comprises:

a plurality of circumferentially disposed rows of height adjustment holes formed in said central core, with each of said rows including a plurality of evenly spaced holes therein;

said height adjusting plate including a locking collar for removably, positively, and adjustably securing to said core; and said locking collar including a single circumferential row of attachment holes therethrough, with said locking collar attachment holes selectively aligning with said evenly spaced holes of each of said rows of said height adjustment holes of said central core when said locking collar is installed thereon.

13. The adjustable height string trimmer head according to claim 12, including a plurality of height adjustment indicator lines disposed upon said central core, with each of said indicator lines corresponding to one of said rows of height adjustment holes thereof.

14. The adjustable height string trimmer head according to claim 11, including:

spacer means for adjustably spacing said trimmer line clamping plate from said floor of said seat, for adjusting said trimmer line passage relative to the trimmer line adjustably secured therein;

said spacer means comprising two threaded adjuster passages formed through said clamping plate, with each of said passages including an adjuster screw installed therethrough and bearing adjustably against said floor of said seat.

15. The adjustable height string trimmer head according to claim 11, wherein each of said end openings of said trimmer line passage has a smoothly radiused periphery for precluding damage and chafing of the trimmer line installed therein.

16. The adjustable height string trimmer head according to claim 11, wherein said trimmer line attachment means are evenly spaced and positioned about said trimmer line attachment disc for proper balance thereof.

17. The adjustable height string trimmer head according to claim 11, wherein said plurality of trimmer line attachment means comprises four evenly spaced and positioned trimmer line attachment elements, with each of said elements having two trimmer line ends extending generally radially therefrom.

18. The adjustable height string trimmer head according to claim 11, wherein said central core, said height adjustment plate, and each said trimmer line clamping plate are formed of aluminum.

19. The adjustable height string trimmer head according to claim 11, including a wheeled motorized string trimmer machine for removably attaching and using said central core, said height adjustment plate, and said trimmer line attachment means therewith.

20. The adjustable height string trimmer head according to claim 11, including a hand held motorized string trimmer machine for removably attaching and using said central core, said height adjustment plate, and said trimmer line attachment means therewith.

\* \* \* \* \*